United States Patent [19]

Sugo et al.

[11] Patent Number: 4,980,335

[45] Date of Patent: Dec. 25, 1990

[54] ACIDIC GAS ADSORBER HAVING A METAL PHTHALOCYANINE ON AN ION EXCHANGER

[75] Inventors: Takanobu Sugo; Jiro Okamoto, both of Gunma; Kunio Fijiwara, Kanagawa; Hideaki Sekiguchi, Chiba; Toshiaki Fujii, Kanagawa, all of Japan

[73] Assignees: Japan Atomic Energy Research Institute; Ebara Corporation, both of Tokyo, Japan

[21] Appl. No.: 316,821

[22] Filed: Feb. 28, 1989

[30] Foreign Application Priority Data

Feb. 26, 1988 [JP] Japan .................................. 63-43567

[51] Int. Cl.$^5$ ........................ B01J 20/26; B01J 20/22; C08J 5/20; C08L 23/36
[52] U.S. Cl. .................................... 502/402; 55/73; 55/74; 423/230; 423/239; 521/29; 521/32; 521/36; 502/401; 502/406
[58] Field of Search .................... 502/402, 401, 11, 12; 423/230, 239; 210/505; 521/29

[56] References Cited

U.S. PATENT DOCUMENTS

| | | | |
|---|---|---|---|
| 3,724,469 | 4/1973 | Reynolds et al. | 502/401 |
| 3,835,072 | 9/1974 | Economy et al. | 521/29 |
| 4,206,043 | 6/1980 | Carlson | 208/207 |
| 4,298,502 | 11/1981 | Carlson | 208/206 |
| 4,313,832 | 2/1982 | Shimizu et al. | 210/663 |
| 4,358,427 | 11/1982 | Urban | 423/230 |
| 4,378,305 | 3/1983 | Carson | 208/206 |
| 4,460,475 | 7/1984 | Hayatsu et al. | 210/674 |

FOREIGN PATENT DOCUMENTS 25082 10/1972 Japan .
102588 9/1974 Japan .

OTHER PUBLICATIONS

Sorption of Sulfur Dioxide by Ion Exchange Resins, Industrial & Engineering Chemistry, vol. 8, No. 3, Jul. 1969, pp. 317-324.
Macroreticular Ion Exchange Resins as Hydrogen Sulfide, I & EC Product Research and Development, vol. 7, No. 1, Mar., 1968.
Atomic Power Industry Shimbun (Newspaper article), 7th page, dd. Sep. 15, 1988.

Primary Examiner—Paul E. Konopka
Attorney, Agent, or Firm—Browdy & Neimark

[57] ABSTRACT

An absorber is capable of selective adsorption and removal of acidic gases of sulfur oxides, nitrogen oxides, chlorine compounds and sulfur-containing compounds such as hydrogen sulfide, as well as organic acid gases. The absorber is characterized by having a metal phthalocyanine supported on an ion exchanger, wherein the ion exchanger has a quarternary ammonium group as an ion-exchange group and the metal phthalocyanine contains iron phthalocyanine in an amount of 0.05-30 wt % of the ion exchanger.

5 Claims, No Drawings

ACIDIC GAS ADSORBER HAVING A METAL PHTHALOCYANINE ON AN ION EXCHANGER

BACKGROUND OF THE INVENTION

The present invention relates to an adsorber capable of selective removal of acidic contaminant gases in air atmosphere.

While air atmosphere is contaminated by various gases such as toxic gases and malodorous gases, acidic gaseous components are very versatile, including sulfur oxides, nitrogen oxides, chlorine compounds and sulfur-containing compounds such as hydrogen sulfide, as well as organic acid gases. A variety of methods have been proposed that are intended to purify air atmosphere containing these acidic gases. For example, it has been proposed that an acidic gas or mist be removed by reacting them with an alkaline substance. However, if the alkaline substance is used in a granular or particulate form, the reaction between the acidic gas or mist with the alkaline substance occurs on the solid's surface and the resulting salt precipitate on that surface will soon deprive the alkaline substance of its ability to remove acidic gases. If on the other hand, the alkaline substance is used in an aqueous liquid form, the aqueous solution will evaporate to cause a change in the concentration of the alkaline substance, thereby instabilizing the ability of the alkaline substance to remove acidic gases over time. With a view to solving these problems, removal of acidic gases by an ion-exchange resin has been proposed.

This method, however, is not an ideal solution. If an anion-exchange resin is used to remove an acidic gas or mist, carbon dioxide in the air is also removed and the amount of acidic gas that can be removed is smaller than when no such adsorption of carbon dioxide occurs. The effects of carbon dioxide are not significant if the gases to be removed are strong acids such as nitrogen oxides and sulfur oxides, but in the case of weakly acidic gases such as hydrogen sulfide, the effects of carbon dioxide are so pronounced as to cause a loss in the ability of the ion-exchange resin to remove acidic gases. This probelem with carbon dioxide is not limited to ion-exchange resins but is unavoidable if one wants to remove contaminant gases from air atmosphere through the reaction of neutralization between acid and base. Carbon dioxide would cause adverse effects on the human body if it were present in high concentrations but if its concentration is as low as it is in ordinary air atmosphere, it is harmless and need not be removed. Therefore, a need has existed for the development of a method or material that is capable of selective removal of non-$CO_2$ acidic gaseous components without being adversely affected by carbon dioxide.

SUMMARY OF THE INVENTION

An object, therefore, of the present invention is to provide an adsorbent that is suitable for use in the removal of acidic gases in air atmosphere with an ion exchanger and which is capable of effectively removing only non-$CO_2$ acidic gaseous components without suffering from the adverse effects of carbon dioxide that have been the principal cause of drop in the performance of prior art adsorbers.

This object of the present invention can be attained by an acidic gas adsorber that comprises an ion exchanger having a metal phthalocyanine supported thereon to ensure that the combined effects of two members will be exhibited.

DETAILED DESCRIPTION OF THE INVENTION

The ion exchanger for use in the acidic gas adsorber of the present invention may be inorganic or organic but an organic ion exchanger is suitable for the purpose of the present invention. Beaded ion-exchange resin are well known organic ion exchangers but fibrous organic ion exchangers are particularly suitable for use in the present invention since they can be easily molded in various forms such as woven or nonwoven fabrics and because they feature fast adsorption rates. While various types of metal phthalocyanine are known in the art such as those having phthalocyanine coordinated with metals including iron, copper, cobalt and nickel, the metal phthalocyanine used in the present invention must contain at least iron phthalocyanine. The content of iron phthalocyanine is preferably within the range of 0.05–30 wt %, more preferably 0.1–10 wt %, of the ion exchanger. If the content of iron phthalocyanine is extremely small or excessive, the intended advantage of the present invention will not be fully attained. Metals other than iron may also coordinate with phthalocyanine and the selection of a suitable additional metal phthalocyanine depends on the use of the adsorber.

There is no particular limitation on the method that can be employed to have a metal phthalocyanine supported on the ion exchanger but impregnating the ion exchanger with a solution or suspension of the metal phthalocyanine is convenient and yet achieves uniform dispersion of the metal phthalocyanine in the ion exchanger. It is difficult to incorporate more than 0.5 wt % of the metal phthalocyanine in a beaded ion-exchange resin by the impregnation method. On the other hand, a fibrous or porous ion exchanger has a larger surface area and an increased amount of metal phthalocyanine can be incorporated in it.

Ion-exchange groups in the ion exchanger may include cation-exchange groups typified by sulfonyl and carboxyl groups but it is essential that they include a strongly basic anion-exchange group typified by a quaternary ammonium group. A weakly basic anion-exchange group typified by a secondary or tertiary amino group may be present but on the condition that a strongly basic ion-exchange group be also present.

If the ion exchanger thus prepared which contains at least a quaternary ammonium group and iron phthalocyanine is brought into contact with air containing hydrogen sulfide, the ion exchanger adsorbs hydrogen sulfide in an amount that corresponds to the ion-exchange capacity of quaternary ammonium groups. In other words, the selectivity for hydrogen sulfide is markedly increased by using this ion exchanger without suffering from the adverse effects of carbon dioxide. Needless to say, the adsorption capacity of this ion exchanger for sulfur oxides and chlorine compounds is the same as the level that have been achieved by the prior art products. The salt form of the quaternary ammonium group may be a re-generated form and/or a form that is obtained by treating the regenerated form with a bicarbonate or carbonate salt. A chlorine or sulfate salt form is practically incapable of removing hydrogen sulfide.

The principal mechanism behind the removal of hydrogen sulfide by the adsorber of the present invention is therefore speculated to be the reaction of neutralization between acid and base but the adsorber eliminates the adverse effects of carbon dioxide completely by using iron phthalocyanine as part of the adsorber.

The following examples are provided for the purpose of further illustrating the present invention but are in no way to be taken as limiting.

EXAMPLE 1

A fibrous anion-exchange resin (3 g) comprising 45 $\mu m^\phi$ filaments having an ion-exchange capacity (capacity for decomposition of a neutral salt) of 2.6 meq/g was regenerated with 1N sodium hydroxide (500 ml) and washed thoroughly with pure water. The resin was then immersed in 1N sodium bicarbonate (500 ml) for 1 h and washed thoroughly with pure water. The resin was subsequently immersed in methanol and the recovered resin was dried with air for 24 h. The dried resin was further dried with a vacuum dryer for 5 h.

In a separate step, a commercial grade of iron phthalocyanine (0.5 g) was added to methanol (50 ml) and the mixture was agitated with a magnetic stirrer for ca. 1 h. A portion of the vacuum-dried fibrous anion-exchange resin that weighed exactly 0.5 g was added to the resulting solution which was further stirred for 5 h.

After completion of the stirring, the resin was recovered, dried with air and further dried with a vacuum-dryer for 5 h.

The so conditioned fibrous anion-exchange resin was packed into a glass tube (i.d. 25 mm) to form a layer 40 mm thick. When air having its $H_2S$ concentration adjusted to 10 ppm was permitted to flow through the tube at a rate of 0.5 L/min, no detectable concentration of hydrogen sulfide was found in the effluent even after 24 h and the resin was found to have adsorbed hydrogen sulfide in an amount of 63.2 mg/g-fiber by the time the level of hydrogen sulfide content in the effluent increased to 1 ppm.

COMPARATIVE EXAMPLE 1

A fibrous anion-exchange resin of the same type as that used in Example 1 was conditioned as in Example 1 up to a stage where it was brought into contact with a solution of sodium bicarbonate and vacuum-dried. This resin was immediately subjected to a test for hydrogen sulfide removal as in Example 1 without further treating it by contact with a metal phthalocyanine. Hydrogen sulfide came to be detected in the effluent in 30 minutes.

EXAMPLE 2

A weakly basic fibrous anion-exchange resin (2 g) comprising 45 $\mu m^\phi$ filaments having an acid adsorption capacity of 2.0 meq/g was mixed with 2 g of a strongly basic fibrous anion-exchange resin that was of the same type as used in Example 1. The mixture was subsequently conditioned as in Example 1.

A portion (1 g) of the conditioned fibrous resin was packed into a glass tube (i.d. 25 mm) to form a layer 50 mm thick. When air adjusted to have a hydrogen sulfide concentration of 5 ppm was permittd to flow through the glass tube at a rate of 0.5 L/min, no detectable concentration of hydrogen sulfide was found in the effluent even after 48 h.

The prior art processes of removing acidic gases mostly involve the reaction of their neutralization with basic substances and have invariably suffered from the adverse effects of carbon dioxide in air atmosphere. The adsorber of the present invention is entirely free from this problem. Hydrogen sulfide is a gas that is as weakly acidic as carbon dioxide and it is a notable example of malodorous components that give off unpleasant smells even if they are present in trace amounts. Furthermore, the smell of hydrogen sulfide is sensed quite often in daily life. Therefore, the adsorber of the present invention which is capable of efficient removal of hydrogen sulfide will offer a greater benefit to human life by improving the quality of the environment that surrounds people and the residential space they lived in.

What is claimed is:

1. An acidic gas adsorber for adsorbing non-$CO_2$ acidic gaseous components from atmospheric air without adsorbing $CO_2$, wherein said adsorber comprises a fibrous organic anion ion-exchanger resin having a strongly basic anion-exchange group in said exchanger and a metal phthalocyanine which contains at least iron phthalocyanine supported on said exchanger.

2. An acidic gas adsorber according to claim 1, wherein said fibrous organic ion exchanger has a quarternary ammonium group as an ion exchange group either alone or in admixture with another ion-exchange group.

3. An acidic gas absorber according to claim 1, wherein said metal phthalocyanine contains iron phthalocyanine in an amount of 0.05–30 wt % of said fibrous organic ion exchanger.

4. An acidic gas adsorber according to claim 3, wherein said metal phthalocyanine is in solution form and impregnated into said fibrous organic anion ion exchanger.

5. An acidic gas adsorber according to claim 3, wherein said metal phthalocyanine is in suspension form and impregnated into said fibrous organic anion ion exchanger.

* * * * *